United States Patent [19]
Meyers et al.

[11] Patent Number: 5,859,715
[45] Date of Patent: Jan. 12, 1999

[54] DIFFRACTIVE LASER SCANNER

[75] Inventors: Mark M. Meyers, Hamlin; Badhri Narayan, Rochester, both of N.Y.

[73] Assignee: Eastman Kodak Company, Rochester, N.Y.

[21] Appl. No.: 684,160

[22] Filed: Jul. 19, 1996

[51] Int. Cl.$^6$ .............. G02B 5/32; G02B 26/10; G02B 27/44; G02B 26/08
[52] U.S. Cl. .............. 359/17; 359/565; 359/18; 359/205; 359/206; 359/207
[58] Field of Search ............. 359/17, 18, 205, 359/206, 207, 208, 565; 235/457

[56] References Cited

U.S. PATENT DOCUMENTS

| | | | |
|---|---|---|---|
| 4,505,537 | 3/1985 | Funato | 350/3.71 |
| 4,753,503 | 6/1988 | Day et al. | 350/3.71 |
| 4,810,046 | 3/1989 | Yamagishi et al. | 350/371 |
| 5,182,659 | 1/1993 | Clay et al. | 359/17 |
| 5,457,550 | 10/1995 | Baba et al. | 359/18 |
| 5,486,694 | 1/1996 | Harris | 359/206 |
| 5,619,350 | 4/1997 | Taki | 359/18 |

*Primary Examiner*—Cassandra C. Spyrou
*Assistant Examiner*—Audrey Chang
*Attorney, Agent, or Firm*—Nelson Adrian Blish

[57] ABSTRACT

A scanner (40) is disclosed which includes a source of coherent light (12), a radial holographic deflector (16), a Fθ lens (62), which images a scanned spot onto an image plane (18). The Fθ lens (62) is comprised of a decentered aspheric mirror (64) and a diffractive—refractive toroidal lens (66). The apparatus is relatively insensitive to variations in the wavelength of the source of coherent light.

8 Claims, 9 Drawing Sheets

DIFFRACTIVE LASER SCANNER

BACKGROUND OF THE INVENTION

1. Field of the Invention

This invention relates to holographic scanners in general, and specifically to a holographic scanner which is relatively insensitive to small variations in wavelength.

2. Description of the Prior Art

Scanners may be used to either write to a media, or read from a media. When writing to a media, information is imposed on the beam prior to the creation of successive sweeps of the beam. Scanners may also be used for reading, in which case the beam impinging on the target has a constant intensity and the light reflected or transmitted by the target being read is monitored to create a signal representative of the information on the scanned target.

Rotating scanners, called polygons, include a device having a plurality of planar mirrors disposed uniformly around a cylinder. The planes of the mirrors are parallel to the axis of the cylinder, and the radii through the centers of the mirrors are at uniform angular spacing around the axis. A motor rotates the device at a high speed and a stationary beam of light is directed at the device which reflects the incident beam and creates successive sweeps of the reflected light beam across an image plane, each along the same linear path.

Holographic scanners use a diffractive surface instead of a reflective surface for deflecting the beam. Such diffractive devices may include a disc of light-transmissive or reflective material, called a holographic deflector having a plurality of identical facets, each of which contains a diffraction grating. The lines of the grating on the holographic deflector may be perpendicular to a radius bisecting the facet, or they may be parallel to such a radius. The two types of gratings are called tangential and radial, respectively.

Holographic laser scanners are known to be relatively insensitive to a wobble of the deflector substrate because they utilize the physical process of diffraction to deflect a laser beam rather than using reflection from a mirrored surface, as is the case with polygon type laser scanners. The mirrored surfaces in polygon scanners double angular errors, such as deflector wobble, and facet to facet perpendicularity errors. Holographic deflectors, on the other hand, reduce the magnitude of angular deflection in the output beam. These holographic deflectors typically use planar gratings to scan the laser beam across the image plane.

Prior art holographic scanner rely on the use of wavelength stabilized laser sources to maintain high precision spot placement while scanning. This is due to the fact that a high spatial frequency grating is used to deflect the laser with a grating pitch which is typically 0.51 to 2.01 $\mu$m. These gratings are wavelength dispersive, and small variations in wavelength cause substantial variations in the output beam's deflection angle. In the page direction a variation in laser source wavelength causes a vertical displacement of the scan line, while in the scan direction, the spot location is directly dependent on the laser wavelength as well as the deflector rotation angle. Laser wavelength changes cause horizontal spot position errors, which increase as a function of deflected scan angle. Thus the farther the spot is from the center of scan, the larger the error.

Semiconductor lasers used in light scanning apparatus, or raster output scanners, provide a compact and low cost light source and a capability for high speed direct modulation of the laser. However, when the semiconductor lasers are current modulated for information processing, their emission wavelength changes depending on the laser chip temperature and the operating current. In prior art holographic scanners using a semiconductor laser, the position of the scanning beam varies as a function of the light source wavelength, and changes both in the scan direction and in the cross scan or page direction, producing artifacts.

U.S. Pat. No. 4,753,503 discloses a laser scanning system using a rotating linear diffraction grating and a semiconductor laser light source. This patent teaches a method of minimizing the beam position error due to wavelength changes by using a stationary compensating grating. The compensating grating is placed parallel to the rotating grating and has a grating spatial frequency identical to the rotating grating. (Identical spatial frequency means the pitch of the grating on the stationary device is the same as the pitch of the grating on the holographic deflector.) This arrangement provides complete correction of beam position error at the center of scan, partial correction toward the end of the scan in the cross scan or page direction, but no correction for the scan line length changes.

U.S. Pat. No. 4,810,046 describes a light beam scanning apparatus using a linear grating rotating hologram with a stationary post hologram to compensate for beam position shift due to the wavelength shift of the semiconductor light source. This scheme reduces the position error in the cross scan direction to within plus or minus 2 $\mu$m for plus or minus 0.3 nm shift in wavelength compared to an uncompensated error of plus or minus 900 $\mu$m. In the line scan direction the position error is reduced to 5 $\mu$m for a 0.3 nm wavelength shift.

U.S. Pat. No. 4,505,537 describes a light scanning apparatus which uses a linear rotating grating and spherical and cylindrical refractive optics to minimize beam position error caused by changes in wavelength of the light source. The optical system is designed to maintain the scanning surface to be optically conjugated by using geometric optics with the grating surface. This scheme reduces the beam position error to 5 $\mu$ms for 0.3 nm in the page direction due to a shift in wavelength, but provides no correction in the scan line direction.

U.S. Pat. No. 5,182,659 describes a light scanning system which uses a pre-scan and post-scan holograms along with a multifaceted rotating grating. This arrangement has the same limited performance as the previously mentioned patents.

SUMMARY OF THE INVENTION

It is an object of the present invention to improve beam placement accuracy for holographic scanner. It is also an object of the present invention to provide a holographic scanner which is relatively insensitive to small variations in wavelength.

A holographic scanner is disclosed which utilizes a source of coherent radiation such as collimated laser beam, and a cylinder lens which focuses a line image of the radiation onto a diffractive facet of a holographic deflector. The laser beam is deflected by the holographic deflector across an image plane as a function of the rotation angle of the diffractive facet on the surface of the holographic deflector. The deflected light is focused to a small spot at the image plane by a combination of a decentered aspheric mirror and a diffractive-refractive lens. The deflected spot moves across the image plane with a velocity which is linearly proportional to the rotational velocity of the holographic deflector, times the radius of the disk. The use of a cylindrical input lens, allows for the elimination of the variation of the location of the spot in a page direction, caused by wedge in the holographic deflector, and variations in the laser source wavelength. The use of a rotationally symmetric mirror and a diffractive-refractive lens, allows for the elimination of the variation in scanned spot position along the scan line with laser source wavelength variations.

DETAILED DESCRIPTION OF THE PREFERRED EMBODIMENT

Figure 1:
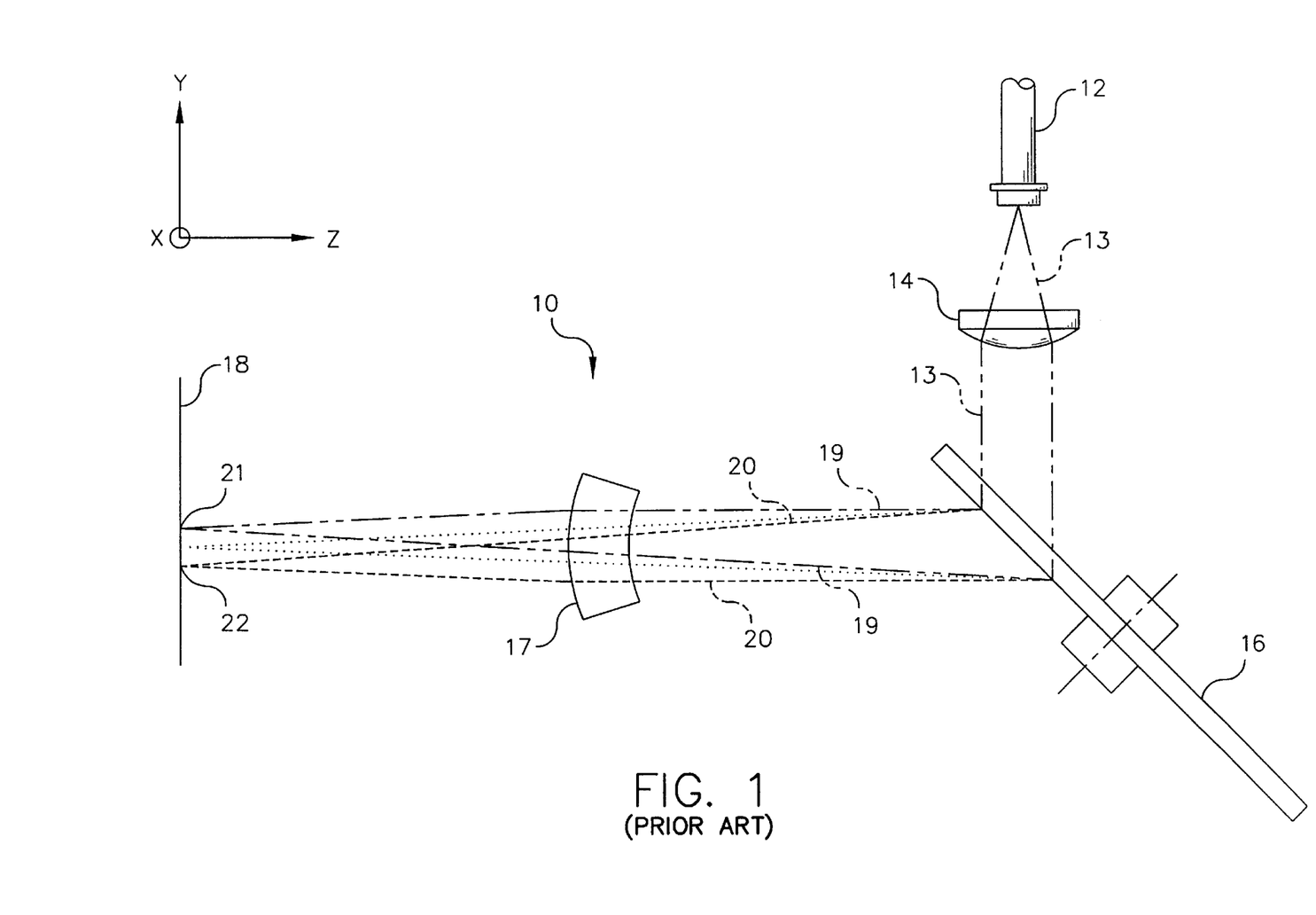
FIG. 1 shows a schematic side view of a prior art embodiment of a holographic scanner.
Figure 2:
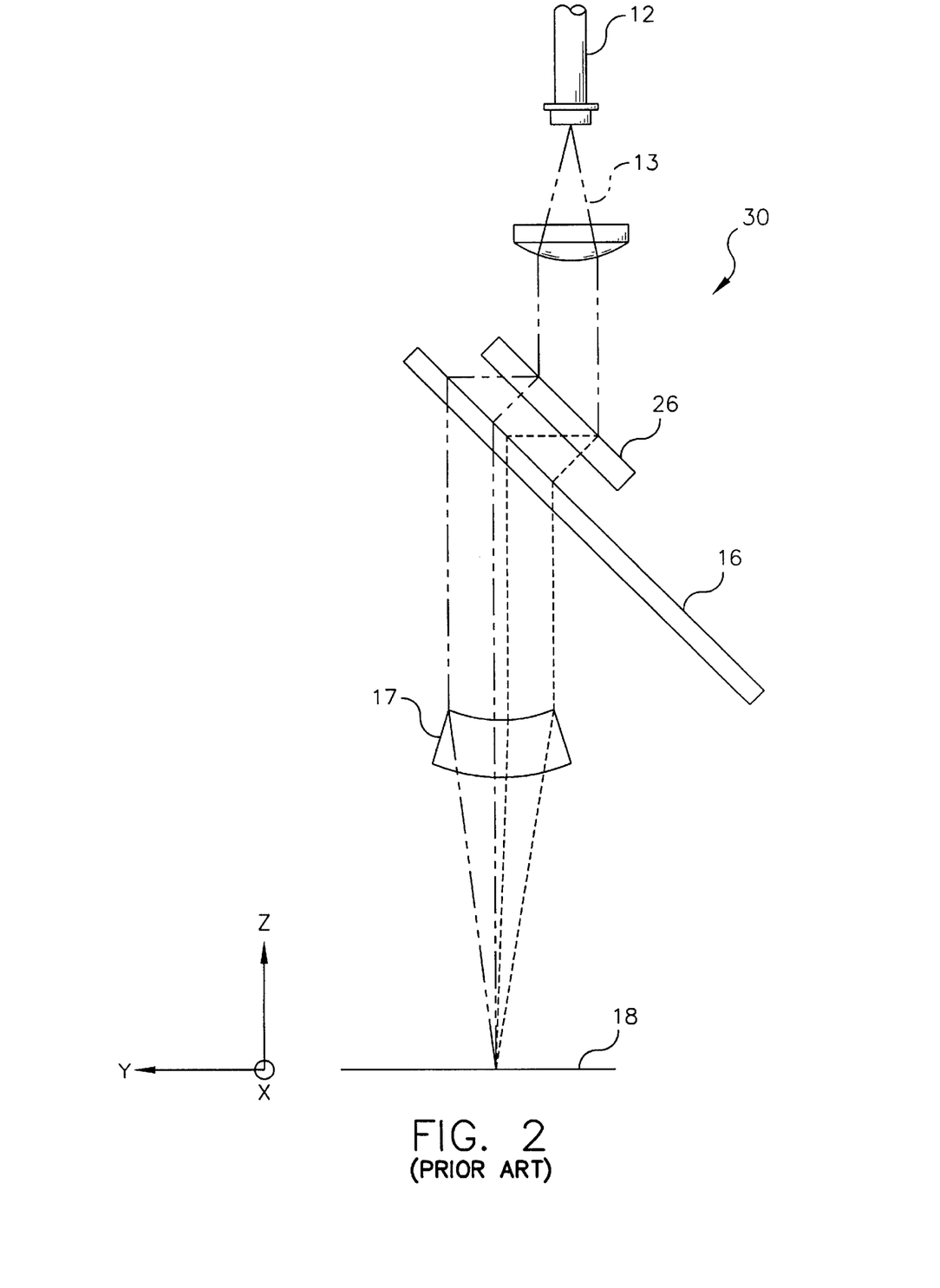
FIG. 2 shows a schematic side view of another prior art embodiment of a holographic scanner.

FIGS. 1 and 2 show a side view of a prior art embodiment of a holographic scanner referred to in general by numeral 10, and the resulting vertical deflection of the scanned beam with wavelength variation. Holographic scanner 10 is comprised of a diode laser 12, a collimator lens 14, a holographic deflector 16, and a Fθ lens 17. A spot is produced at image plane 18 by the holographic scanner 10.

In order to clarify the description that follows a coordinate system is shown in FIG. 1. The "y" direction at the image plane 18 is sometimes referred to as the "page direction". This is the direction that a photo sensitive media would be moved relative to the holographic scanner. The "x" direction, which is into the page in FIG. 1, is the direction along which a spot of light would be scanned by the holographic scanner 10. This is sometimes referred to as the "scan direction". Light arrives from holographic scanner 10 generally along the z-axis.

In the page direction (along the y-axis), at the center of scan, the incident light 13 is diffracted by the holographic deflector 16 according to the equation $$\text{Sin}(\theta_i) - \text{Sin}(\theta_x) = m^*\lambda/d$$

where

θi=incident angle of beam

θx=diffraction angle

λ=wavelength of laser beam d=grating spacing m=diffraction order (typically, m=1).

In FIG. 1, laser beam 13 is diffracted as shown, forming a beam 19, which produces spot 21 at the image plane 18. A small change in wavelength of the beam 13 produced by laser 12, is diffracted at a different angle by holographic deflector 16 and results in beam 20. The diffracted beam 20 causes a shift in the spot location at image plane 18 forming spot 22. The distance the spot 21 is shifted is approximately given by:

$$\Delta y(\lambda) = F^* \Delta \theta_{dy}(\lambda)$$

where

Δy(λ)=distance shifted

F=scan direction focal length $\Delta\theta_{dy}(\lambda) = m(\lambda_0 - \lambda)/d$.

θ$_{Dy}$=deflection scan angle (scan direction)

λ$_0$=initial wavelength

FIG. 2 shows another prior art holographic scanner 30. The positional change in the scan line location in a cross scan or page direction (along the y-axis) has been minimized by inserting a compensating grating 26 before the holographic deflector 16. The page direction (y-axis) angular variation at image plane 18, caused by the wavelength shift at the compensating grating, exactly cancels the angular variation at the holographic deflector at the center of scan. However, some variation of scan line straightness, i. e. differential bow of the scan line along the y-axis, occurs at large deflection angles, even with a compensating grating. In the line scan direction the beam deflection angle is determined by:

$$\text{Sin}(\theta_{dx}) = (\lambda/d) \text{Sin}(\theta_r).$$

where

θ$_{dx}$=deflected scan angle in the x-axis

θ$_r$=disk rotation angle.

Therefore, for small variations in wavelength the variation in the deflected angle is given approximately by:

$$\Delta\theta_{dx} = [m(\lambda_0 - \lambda)/d]^* \text{Sin}(\theta_r)$$

The distance the spot is shifted along the x-axis is:

$$\Delta x(\lambda) = F^* \Delta\theta_{dx}(\lambda).$$

Figure 3:
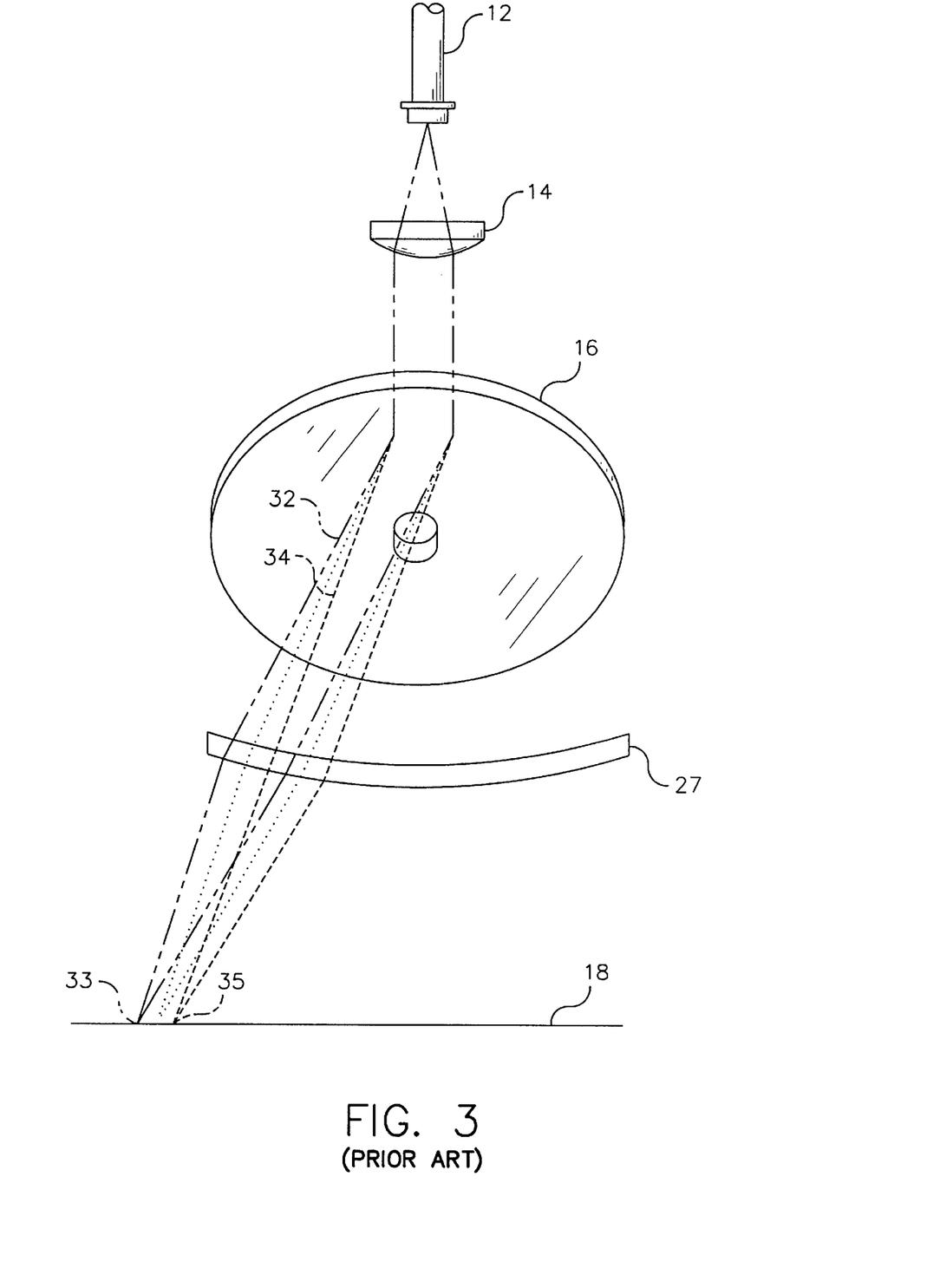
FIG. 3 shows a top view, partially in perspective of a prior art holographic scanner.

The variation in scan direction pixel placement occurs with variations in wavelength whether there is a compensating grating present or not. To correct this problem a stabilized diode laser, such as a distributed feedback laser diode or an external cavity laser diode, as shown in FIG. 3, is required. This solution is necessary in order to form sharp edges in the scan line direction. Soft edges are due to a shift of the spot location on the x-axis due to wavelength change. The amount of waviness increases with the distance away from the center of the scan line.

The wavelength of a laser diode source can vary by as much ±0.3 nm while current to the laser diode is being modulated. The laser diode can also change wavelength with shifts in ambient temperature. Also, the output wavelength of diode lasers may also vary from one manufacturing shipment to another. Any variation in wavelength could cause either printing or scanning errors; or necessitate realignment of the holographic scanner to each specific diode laser.

As shown in FIG. 3 a first beam 32 is diffracted by holographic deflector 16 at a different angle than beam 34, which has a different wavelength. This figure shows schematically the effect of varying wavelengths on the spot location in the scan direction x-axis.

Figure 4:
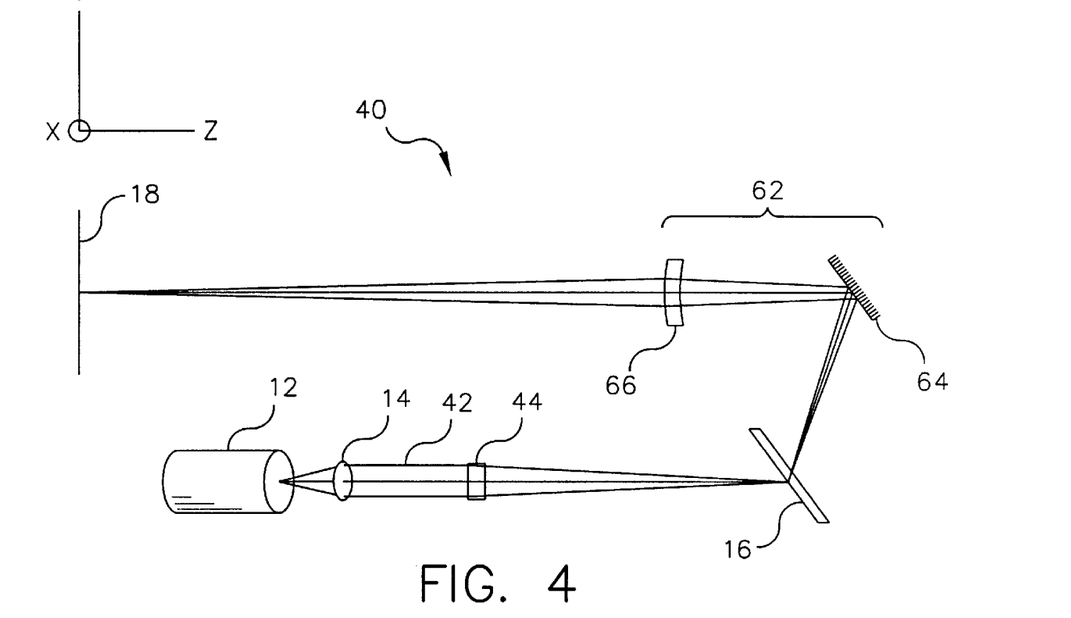
FIG. 4 shows a side view of a holographic scanner according to the present invention.

FIG. 4 shows a side view of a holographic scanner 40 according to the present invention. A coherent source of radiation, such as a diode laser 12, is collimated by collimator lens 14. Collimated laser beam 42 is incident on a cylindrical lens 44 which focuses the incident beam to a diffractive facet on a rotating holographic deflector 16.

Figure 5:
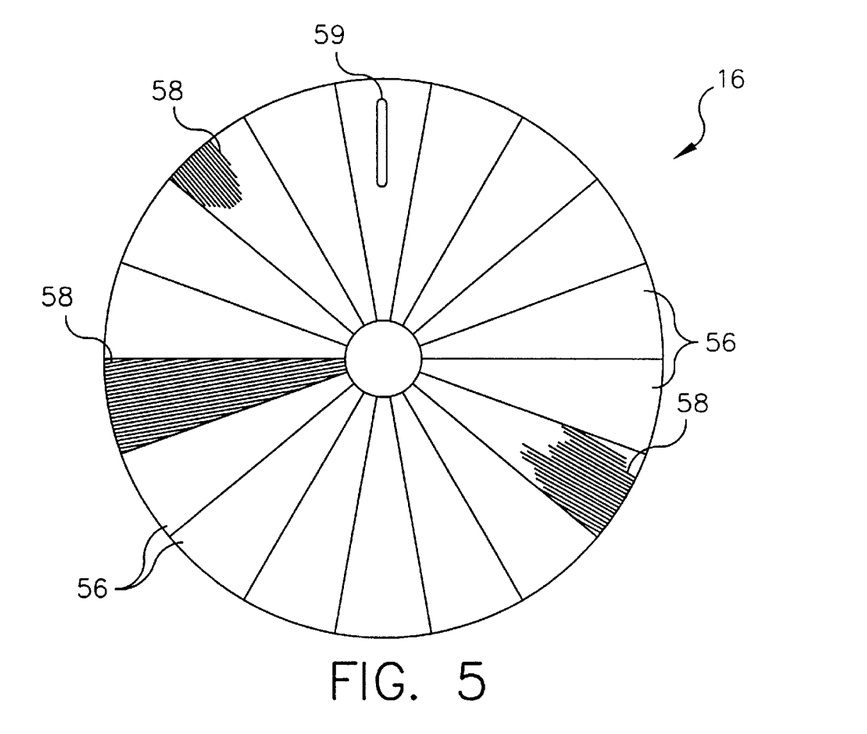
FIG. 5 shows a plan view of a holographic deflector.

Lens 44 is placed between the laser 12 and the holographic deflector in order to focus the beam to a spot of the required small area. This is necessary since the beam is only useful for reading or writing an image when it is wholly on a single facet of the holographic deflector. When the beam is incident on two facets, two diffracted beams are created and each one is truncated thereby distorting the spots created on the target by these two beams. Cylinder lens 44 focuses laser beam to a line 59, as shown in FIG. 5.

The holographic deflector 16 is a multi-facet disk. In the present embodiment, there are eighteen identical facets 56. Each facet 56 contains a diffraction grating 58. The lines of the grating in each facet are parallel to a radius which bisects the facet. While some grating pattern lines are shown in FIG. 5, it will be recognized that they are both incomplete and merely representative. The diffraction gratings 58 are formed as either a surface relief pattern in photoresist, or as a modulated refractive index pattern in a volume holographic material such as a photopolymer or dichromated gelatin, carried by a transparent glass support. A typical spot 59 is formed by focusing a line image on the diffractive facet. Geometrical imaging can be used to magnify the focused spot onto the image plane 18.

Holographic deflector 16 diffracts the incident laser beam 42 so that it is deflected across the image plane as the holographic deflector is rotated. The holographic deflector is mounted on a motor (not shown) so that as the holographic deflector rotates the beam is caused to scan or sweep in the x-direction, as shown in FIG. 4.

The beam leaving the holographic deflector has a cross-sectional area much larger than is desired for the spot of light impinging on the image plane 18. It is therefore necessary to image the beam to its desired size at the image plane, and maintain the focus of the spot on the image plane as the spot scans. Lenses for accomplishing this are commonly called Fθ lenses. In this embodiment a Fθ lens 62 consisting of a decentered aspheric mirror 64 and a diffractive-refractive lens 66 is used to image the laser beam to a small spot on the image plane 18. In the preferred embodiment diffractive—refractive lens 66 is toroidal on at least one face.

Aspheric mirror 64 reflects the laser beam from the holographic deflector 16 to diffractive—refractive lens 66. This arrangement reduces the overall size of holographic scanner 40.

Figure 6:
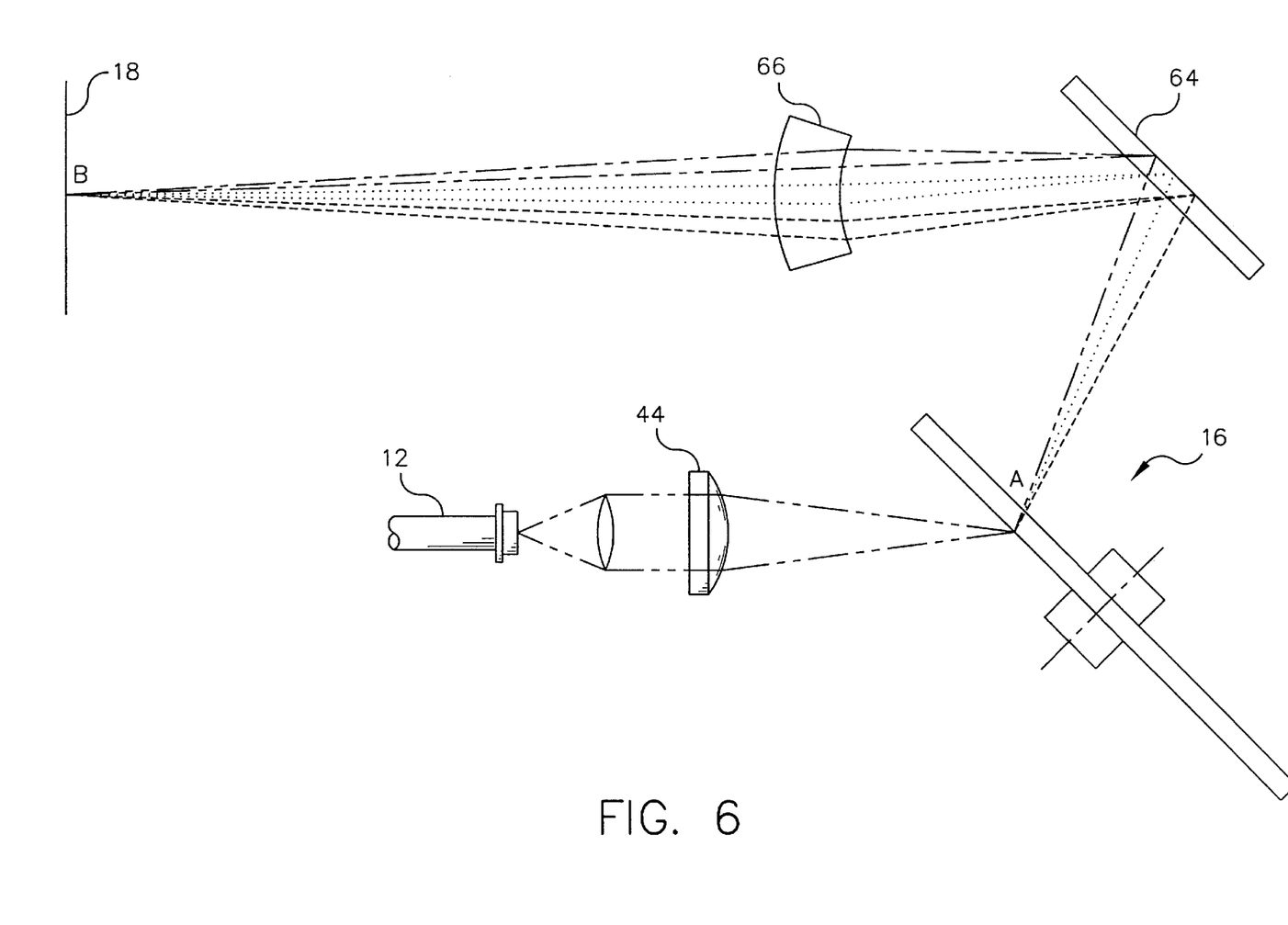
FIG. 6 shows a side view of a holographic scanner according to the present invention showing the effect of variations in laser wavelength in the page direction.

The invention can be understood by considering that a lens with a larger numerical aperture, or smaller F/# (F/# =focal length/lens diameter) still images a whole fan of light to a single point, as shown in FIG. 6. The numerical aperture of the scanned laser beam is smaller than the acceptance cone for the diffractive—refractive lens 66 so the laser beam deflection angle can vary and still be incident on the lens and focused to the same scan line even though wavelength variations may cause variations in the output beam's diffracted angle the diffractive—refractive lens 66 still images the scanned spot to the same location.

By adjusting the scan direction focal length of the diffractive—refractive lens, the magnification of the Fθ lens is set to a desired value for a given total conjugate length. In this invention the magnification of the Fθ lens is greater than one to magnify the line image on the diffractive facet of the holographic deflector.

Figure 7A:
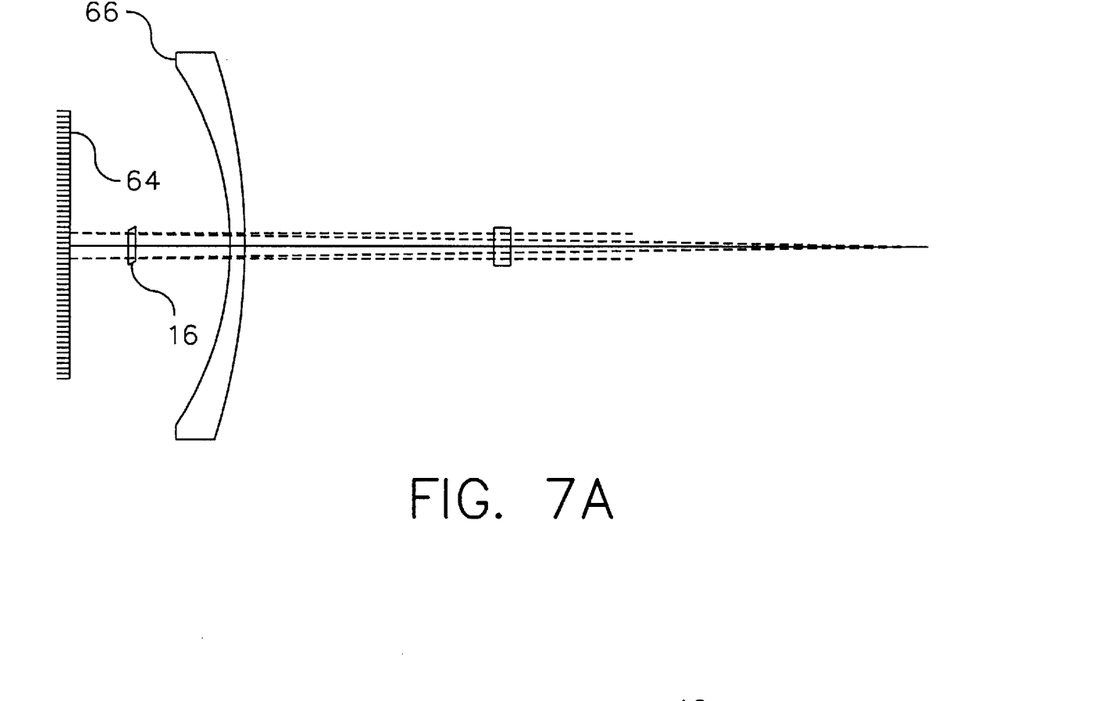
FIG. 7A shows a top view of a holographic scanner according to the present invention with the writing spot at the center of the page.
Figure 7B:
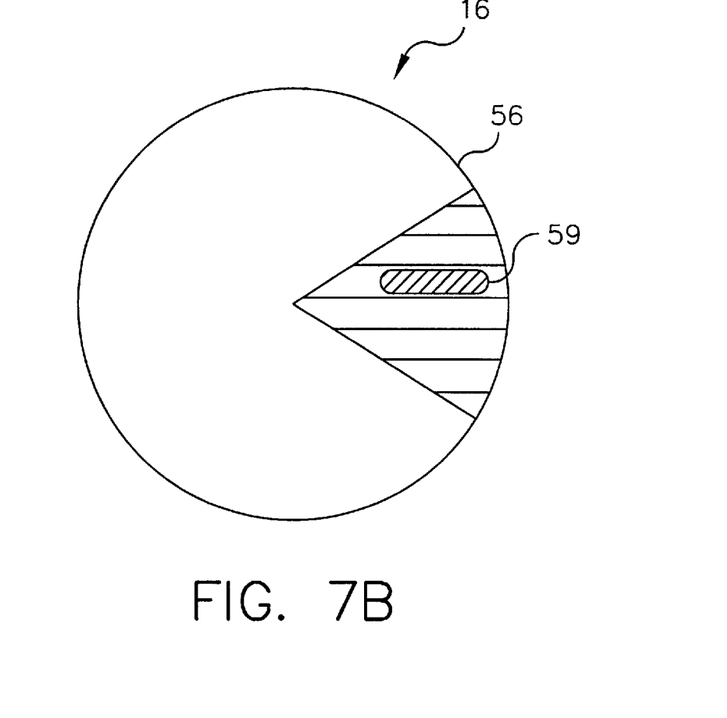
FIG. 7B shows the position of the holographic deflector corresponding to the view shown in FIG. 7A.

A top view of the invention as shown in FIG. 7A, shows the beam remains collimated in a direction parallel to the scan direction up to and through the holographic deflector 16, and is focused to a small spot on the image plane 18 by the Fθ lens, when the spot 59 is at the center of the facet 56. The Fθ lens is designed to have the scanned height of the focused spot be linearly proportional to the rotation angle of the holographic deflector. To accomplish this, Fθ lens is designed to have specific amounts of distortion to allow it to form images at heights which are directly proportional to the facet rotation angle.

Figure 8A:
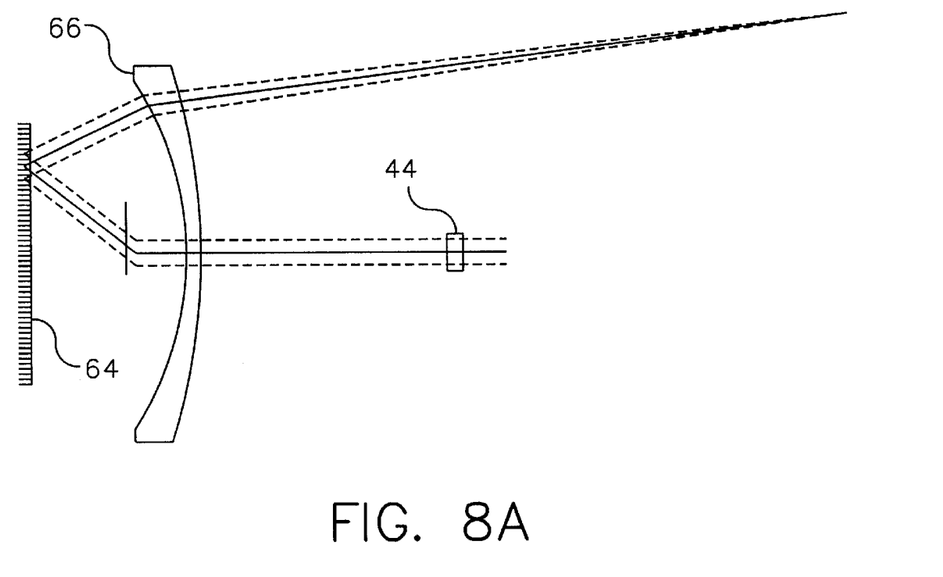
FIG. 8A shows top view of a holographic scanner according to the present invention with the writing spot at the edge of the page.
Figure 8B:
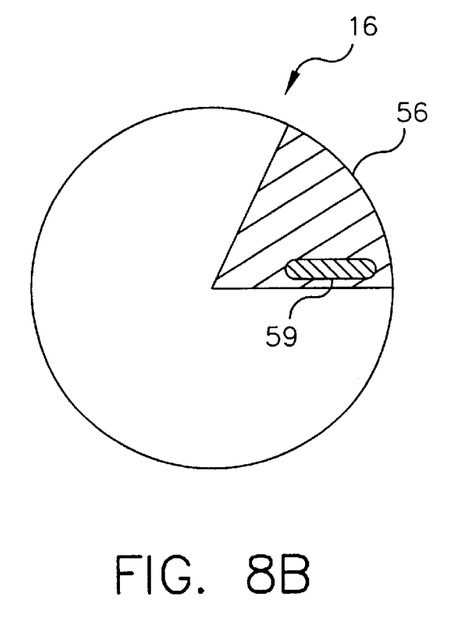
FIG. 8B shows the position of the holographic deflector corresponding to the view shown in FIG. 8A.
Figure 9:
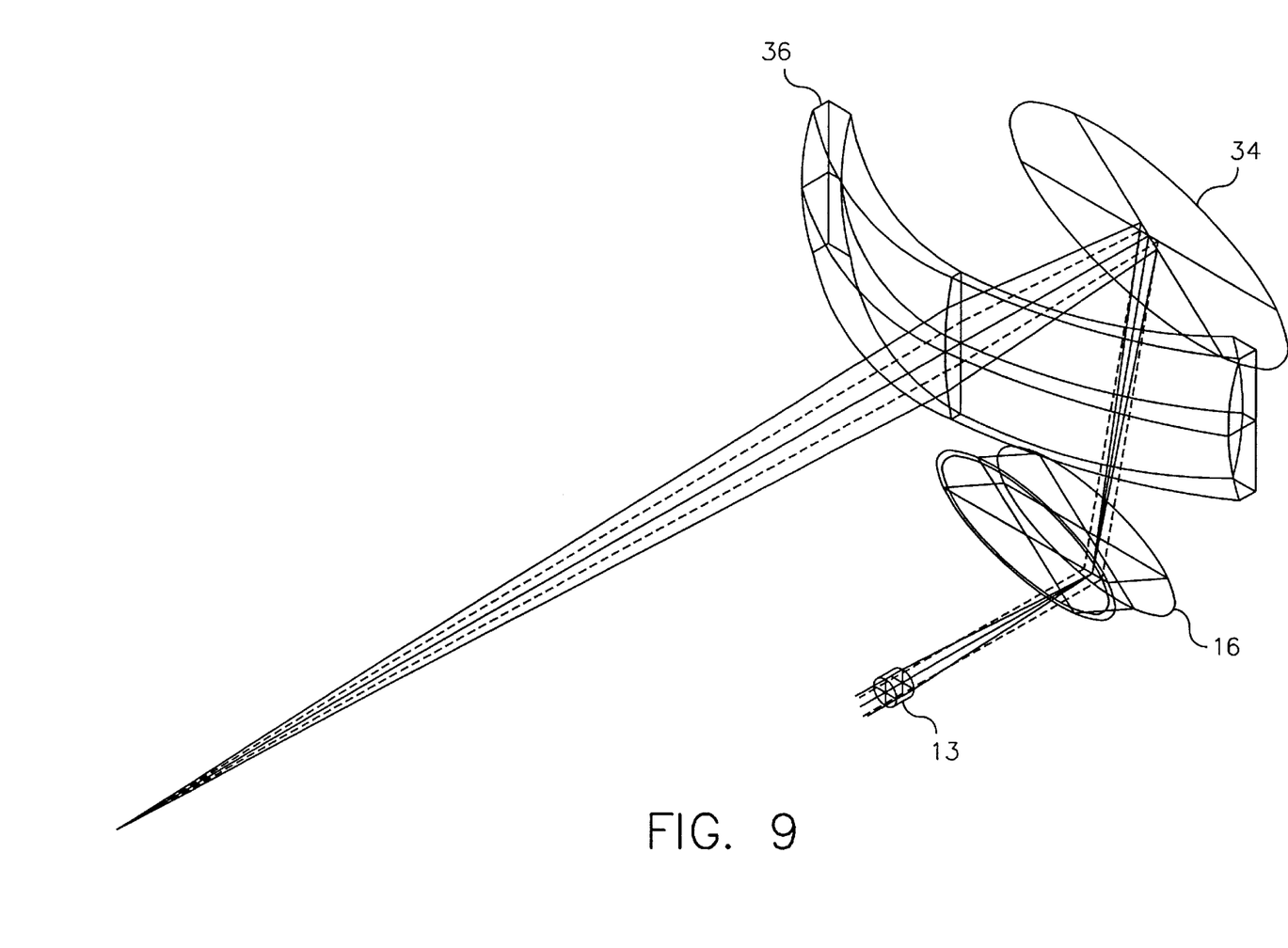
FIG. 9 shows a perspective view of a laser scanner according to the present invention.

In FIGS. 8A and 8B the holographic deflector 16 has rotated and spot 59 is at the edge of facet 56. This causes the spot at the image plane 18 to be at the end of the scan line.

A standard lens forms images of light from infinity which is proportional to the tangent of the angle, i.e.

$$h = F^* \text{Tan } \theta$$

where $h$=height of the image

The velocity of the spot on the page is non-linear, and therefore, the laser intensity can not be modulated with a linear relation between image data and pixel position, as shown in the following formula.

$$dh/dt = F^* \text{Sec }^2\theta^* d\theta/dt$$

$dh/dt$=scan velocity.

where $d\theta/dt$=holographic deflector angular velocity

By designing a lens to meet the Fθ condition the image height is directly proportional to the scan angle, and the velocity of the spot on the image plane is linearly proportional to deflector rotational velocity, as can be seen from the equations $$h = F^*\theta$$

and $$dh/dt = F^* d\theta/dt.$$

For a diffractive laser scanner the deflection of the beam is related to the scanner rotation by $$\text{Sin }(\theta_{dx}(\lambda)) = (\lambda/d) \text{ Sin }(\theta_r)$$

$\theta r$=holographic deflector rotation angle

As stated previously, wavelength variations cause variations in the scan and page direction diffraction angle. The invention corrects for scan direction diffraction angle shifts by using an Fθ lens formed by a combination of an aspheric mirror and a diffractive-refractive lens. The properties of these lenses are discussed extensively in U.S. patent application Ser. No. 08/175,708. The focal length of a diffractive lens is wavelength dependent and is given by $$F(\lambda)=(\lambda_0/\lambda)F_0.$$

Therefore, the overall position of the scanned spot along the scan direction is given by $$h=F(\lambda)*\text{Sin }(\theta_{dx}(\lambda))=(\lambda_0/\lambda)F_0*(\lambda/d)\text{ Sin }(\theta_r)=F_0*(\lambda_0/d)\text{ Sin }(\theta_r)$$

which is independent of wavelength to the first order which is equivalent to achromatizing the laser scanner over the spectral region of interest.

Since the Fθ lens 62 has a toroidal component in the preferred embodiment, incorporating some refractive power, the variation of the glass or plastic refractive index with wavelength adds additional, small magnitude wavelength dependence, which is eliminated by balancing the fraction of the Fθ lens power, which is diffractive versus the fraction which is refractive in the current invention.

Optical data for two embodiments of the current invention are listed below. The first embodiment uses an input cylindrical lens with power in the diffractive-deflector facets of the holographic deflector. The second embodiment uses a toroidal input lens with a deflector comprised of linear gratings. A perspective drawing of the laser scanner is shown in FIGS. 7A and 8A. The data for the surfaces of elements of the holographic scanner shown in FIG. 4, 7A, 8A and 9, are shown in Table 1 below.

TABLE 1

Achromatized Diffractive Laser Scanner Incorporating Deflector With Optical Power

| | RDY | THI | GLASS |
|---|---|---|---|
| OBJ: | INFINITY | INFINITY | |
| 1: | INFINITY | 0.000000 | |
| STO: | INFINITY | 4.000000 | BK7_SCHOTT |
| Cylinder Lens | | | |
| 3: | −25.80000 | 50.530700 | |
| 4: | INFINITY | 0.000000 | |
| | TILT ABOUT | x = 33.0 | |
| 5: | INFINITY | 3.000000 | BK7_SCHOTT |
| HOE: | | | |
| HWL = 780.0 | C3: 4.0696E−07 | C4: 3.8052E−03 | C5: 9.3539E−03 |
| | C6: 1.8978E−05 | C7: 4.3395E−04 | C8: 9.8162E−04 |
| | C9: −3.1169E−04 | C10: 7.7085E−07 | C11: 1.7042E−05 |
| | C12: 4.1997E−05 | C13: −4.5177E−06 | C14: 8.4847E−05 |
| | C15: −6.6616E−09 | C16: 2.5909E−07 | C17: 6.7103E−07 |
| | C18: −1.8934E−08 | C19: 2.8091E−06 | C20: −1.7410E−06 |
| | C21: −1.6766E−10 | C22: 4.6592E−10 | C23: 4.4406E−10 |
| | C24: −4.6563E−09 | C25: 3.4954E−08 | C26: −3.4488E−08 |
| | C27: −1.1391E−07 | C36: −6.1060E−13 | C44: 6.1174E−10 |
| | C55: 4.3594E−16 | C65: −1.3386E−12 | |
| 6: | INFINITY | 0.000000 | |
| | DECENTERED ALONG | y = −3.967 | |
| 7: | INFINITY | 90.318599 | |
| | TILT ABOUT | x = 33.0 | |
| 8: | 15279.79666 | 0 | REFLECTOR |
| ASP: | | | |
| K: 0.000000 | | | |
| A: −.151451E−07 | B: 0.545379E−13 | C: 0.194069E−16 | D: 0.131437E−20 |
| E: 0.755441E−25 | F: −.226694E−28 | | |
| | DECENTERED ALONG | y = 7.329 | |
| | TILT ABOUT | x = −33.00 | |
| 9: | INFINITY | −64.969203 | |
| | TILT ABOUT | X = −66.00 | |
| 10: | INFINITY | 0.000000 | |
| 11: | 155.21743 | −7.336221 | BK7_SCHOTT |
| HWL: 780.00 | | | |
| | C3: −2.7493E−03 | C4: −9.6816E−06 | C5: −2.6471E−03 |
| | C6: 1.5138E−06 | C7: −−1.2114E−06 | C8: −6.1368E−07 |
| | C9: −6.6539E−07 | C10: −2.2103E−08 | C11: −1.5586E−08 |
| | C12: −6.3105E−08 | C13: 1.0253E−08 | C14: 8.3010E−08 |
| | C21: −2.9058E−12 | C27: −2.4088E−08 | C36: 1.4542E−16 |
| | C44: 7.6769E−10 | C55: −2.3076E−21 | C65: −9.0174E−12 |
| 12: | 64.56794 | −312.972997 | |
| Y TOROID | | | |
| RDY: 64.567 | | | |
| RDX: 333.38061 | | | |
| K: 0.000000 | | | |
| Ay: −.122742E−05 | By: −.132951E−11 | Cy: −.639990E−22 | Dy: 0.000000E+00 |
| IMG: | INFINITY | 0.000000 | |
| WL | 781.00 | 780.00 | 779.00 |
| REFRACTIVE IDICIES | | | |
| GLASS CODE | 781.00 | 780.00 | 779.00 |
| BK7_SCHOTT | 1.511162 | 1.511183 | 1.511204 |

TABLE 2

Achromatized Diffractive Laser Scanner
Incorporating A Linear Grating Deflector

| | RDY | THI | GLASS | |
|---|---|---|---|---|
| OBJ: | INFINITY | INFINITY | | |
| STO: | INFINITY | 4.000000 | BK7_SCHOTT | |
| 2: | −25.80000 | 49.834259 | | |
| Y TOROID | Ay: 0.159446E−04 | By: −.797852E−07 | | |
| 3: | INFINITY | 0.000000 | | |
| | TILT ABOUT | x = 33.0 | | |
| | TILT ABOUT | x = 33.0 | | |
| 4: | INFINITY | 3.000000 | BK7_SCHOTT | |
| GRATING | | | | |
| | GRO: 1 | | GRATING SPACING = | 0.716 μm |
| 5: | INFINITY | 0.000000 | | |
| | DECENTER ALONG | y = 2.993 | | |
| 6: | INFINITY | 46.193453 | | |
| | TILT ABOUT | x = 33.0 | | |
| 7: | 730.72356 | 0.000000 | REFLECTOR | |
| | ASP: | | | |
| | A: 0.133810E−06 | B: 0.434500E−09 | C: −.342420E−12 | D: 0.920626E−16 |
| | TILT ABOUT | x = −33.0 | | |
| 8: | INFINITY | −51.033692 | | |
| | TILT ABOUT | x = 33.0 | | |
| 9: | INFINITY | 0.000000 | | |
| 10: | 87.82046 | −4.000000 | BK7_SCHOTT | |
| | HWL: 780.00 | | | |
| | C3: −3.2301E−03 | C4: 2.8234E−06 | C5: −3.3587E−03 | |
| | C6: −1.6886E−07 | C7: 4.2659E−07 | C8: −6.7463E−07 | |
| | C9: −2.0543E−06 | C10: −1.2910E−07 | C11: 3.5190E−08 | |
| | C12: 1.7063E−07 | C13: 2.9265E−08 | C14: 9.1791E−07 | |
| | C21: −3.0412E−11 | C22: 1.3723E−11 | C23: −2.7343E−11 | |
| | C24: 4.6236E−11 | C25: 18896E−10 | C26: 3.1470E−10 | |
| | C27: 9.3790E−10 | C36: −4.2864E−18 | C37: 5.1515E−17 | |
| | C44: 1.0000E−30 | C55: −4.8755E21 | C65: −7.3959E−14 | |
| 11: | RDY: 36.55447 | −217.917019 | | |
| Y TOROID | | | | |
| | RDX: 85.46964 | | | |
| 12: | INFINITY | 0.000000 | | |
| IMG: | INFINITY | 0.000000 | | |
| REFRACTIVE INDICES | | | | |
| | WL | 781.00 | 780.00 | 779.00 |
| BK7_SCHOTT | | 1.511162 | 1.511183 | 1.511204 |

The diffractive surfaces on holographic deflector 16 in embodiment 1 and diffractive—refractive lens 66 are asymmetric and determined by polynomials with up to 65 terms of the form $$\phi(x,y) = (2\pi m/\lambda) \Sigma_i \phi_i$$

where $$\phi_i = c_i x^j y^k$$

$$i = (\tfrac{1}{2})[(j=k)^2 + j + 3k]$$

$$k, j = 0, 1 \ldots 10.$$

It is also within the scope of the invention to use asymmetric diffractive lens and add spherical and cylindrical refractive components to achieve an overall toroidal focal distribution.

The current invention has a maximum deviation for the ideal spot location across the whole scan width of 0.225 μm in the page direction and 1.1 μm in the scanned direction for a ±0.3 nm wavelength shift. This is much less than any of the prior art and is accomplished with fewer optical elements.

Figure 10:
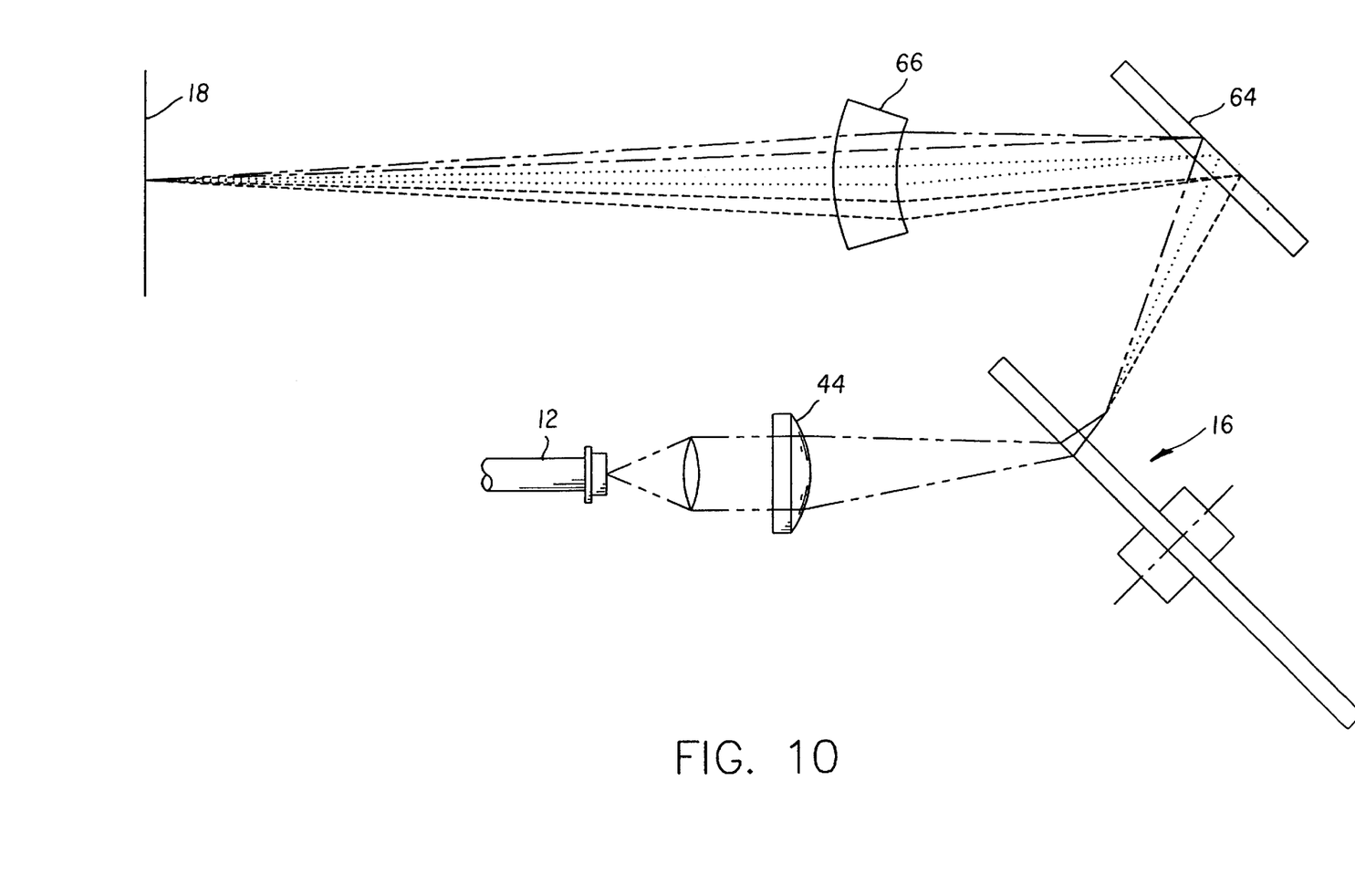
FIG. 10 shows a side view of a laser scanner according to the present invention with the laser beam out of focus at the surface of the holographic deflector.

FIG. 10 shows how the invention functions when the laser spot is out of focus at the surface of the holographic deflector 16. The line image from the input cylindrical optic can be focused in front of or behind the diffractive facet of holographic deflector 16 to increase the vertical dimension of the laser beam. This will reduce the risk of a small piece of dust obscuring a large fraction of the incident beam. The thicknesses of the air spaces before and after the holographic deflector and the Fθ lens are then adjusted accordingly.

The system is capable of grayscale printing resolutions from 300 to 1200 dpi for a ±30 degree scan angle. The invention is also insensitive to deflector wobble or residual error in the deflector substrate, and to laser source wavelength variations in the page and scan direction. The system is also low cost since all the optics for the system are mass producible by injection molding or by replication.

| PARTS LIST | |
|---|---|
| 10. Holographic Scanner | 30. Holographic Scanner |
| 12. Diode Laser | 32. First Beam |
| 13. Laser Beam | 33. First Spot |
| 14. Collimator Lens | 34. Second Beam |
| 16. Holographic Deflector | 35. Second Spot |
| 17. Fθ Lens | 56. Facets |
| 18. Media/Image Plane | 58. Gratings |
| 19. Beam | 59. Spot |
| 20. Diffracted Beam | 62. Fθ Lens |
| 21. Spot | 64. Aspheric Mirror |
| 22. Diffracted Spot | 66. Diffractive - Refractive Lens |
| 26. Compensating Grating | |

What is claimed is:

1. A scanning apparatus for providing a substantially straight line scan of a radiation spot with a selected shape and orientation comprising:

a source of coherent radiation;

a holographic deflector for creating a scanned beam from said source of coherent radiation, mounted for rotation about an axis and having at least one pattern of substantially parallel grating lines;

a collimating lens, located between said source of coherent radiation and said holographic deflector;

a cylinder lens located between said collimating lens and said holographic deflector for forming a line image on a facet of said holographic deflector;

an image plane for receiving the scanned beam;

a diffractive—refractive lens which is primarily diffractive in a scan direction and primarily refractive in a page direction, located between the holographic deflector and the image plane for focusing the scanned beam to a spot at the image plane; and a mirror between the holographic deflector and the diffractive—refractive lens for maintaining spot size and scan linearity.

2. A scanning apparatus as in claim 1 wherein said mirror is a decentered aspheric mirror.

3. A scanning apparatus as in claim 1 wherein said diffractive—refractive lens is a toroidal lens.

4. A scanning apparatus as in claim 1 wherein said holographic deflector incorporates optical and aspheric correcting terms to correct residual aberrations and for generating a straight laser.

5. A scanning apparatus as in claim 1 wherein said diffractive—refractive lens achromatizes dispersive effect of the holographic deflector.

6. A scanning apparatus as in claim 1 wherein chromatic errors in the page direction are achromatized by the diffractive-refractive lens.

7. A scanning apparatus as in claim 1 wherein a first surface of said diffractive-refractive lens is a diffractive surface and a second surface of said diffractive—refractive lens is a toroid.

8. A scanning apparatus as in claim 1 wherein a first surface of said diffractive-refractive lens is a diffractive surface and a second surface of said diffractive—refractive lens is a cylinder.

* * * * *